United States Patent
Kim et al.

(10) Patent No.: US 11,420,419 B2
(45) Date of Patent: Aug. 23, 2022

(54) AUSTENITE-BASED MOLTEN ALUMINUM-PLATED STEEL SHEET HAVING EXCELLENT PROPERTIES OF PLATING AND WELDABILITY

(71) Applicant: POSCO, Pohang-si (KR)

(72) Inventors: Young-Ha Kim, Gwangyang-si (KR); Hyeon-Seok Hwang, Gwangyang-si (KR); Kwang-Geun Chin, Gwangyang-si (KR); Heung-Yun Kim, Gwangyang-si (KR)

(73) Assignee: POSCO, Pohang-si (KR)

(*) Notice: Subject to any disclaimer, the term of this patent is extended or adjusted under 35 U.S.C. 154(b) by 1095 days.

(21) Appl. No.: 16/063,808

(22) PCT Filed: Dec. 22, 2016

(86) PCT No.: PCT/KR2016/015089
§ 371 (c)(1),
(2) Date: Jun. 19, 2018

(87) PCT Pub. No.: WO2017/111491
PCT Pub. Date: Jun. 29, 2017

(65) Prior Publication Data
US 2020/0262181 A1    Aug. 20, 2020

(30) Foreign Application Priority Data
Dec. 24, 2015 (KR) .......... 10-2015-0186138

(51) Int. Cl.
*B32B 15/01*      (2006.01)
*C23C 2/12*       (2006.01)
(Continued)

(52) U.S. Cl.
CPC ........... *B32B 15/012* (2013.01); *B32B 15/04* (2013.01); *B32B 15/043* (2013.01); *B32B 15/18* (2013.01);
(Continued)

(58) Field of Classification Search
CPC ..... B32B 15/012; B32B 15/04; B32B 15/043; B32B 15/18; C22C 38/18; C22C 38/60;
(Continued)

(56) References Cited

U.S. PATENT DOCUMENTS

2003/0145911 A1    8/2003  Hoffmann et al.
2009/0010793 A1    1/2009  Becker et al.
(Continued)

FOREIGN PATENT DOCUMENTS

CN    101346489    1/2009
CN    102348824    2/2012
(Continued)

OTHER PUBLICATIONS

Machine Translation, Fukio, JP 11-279734, Oct. 1999. (Year: 1999).*
(Continued)

*Primary Examiner* — Michael E. La Villa
(74) *Attorney, Agent, or Firm* — Cantor Colburn LLP

(57) ABSTRACT

Provided are an austenite-based molten aluminum-plated steel sheet comprising: a steel plate which contains, by weight %, 0.3 to 0.9% of C, 12 to 25% of Mn, 0.5 to 2.5% of Si, 0.3 to 3.0% of Al, 0.01 to 0.5% of Ti, 0.05 to 0.5% of V, 0.01-0.5% of Mo, 0.01-0.2% of Sn, 0.001-0.1% of Co, and 0.001-0.1% of W, the remainder being Fe and unavoidable impurities; and a molten aluminum-based plated layer formed on a surface of the steel plate, and a method for producing the same.

19 Claims, 2 Drawing Sheets

(51) Int. Cl.
*C23C 2/28* (2006.01)
*C23C 2/40* (2006.01)
*C22C 38/04* (2006.01)
*C22C 38/12* (2006.01)
*C22C 38/10* (2006.01)
*C22C 38/06* (2006.01)
*C22C 38/14* (2006.01)
*C22C 38/02* (2006.01)
*C22C 38/00* (2006.01)
*C21D 6/00* (2006.01)
*C23C 2/02* (2006.01)
*C21D 9/46* (2006.01)
*C22C 21/00* (2006.01)
*C22C 21/02* (2006.01)
*C22C 38/18* (2006.01)
*C22C 38/60* (2006.01)
*C22C 38/24* (2006.01)
*C22C 38/46* (2006.01)
*C22C 38/48* (2006.01)
*C22C 21/06* (2006.01)
*C22C 38/22* (2006.01)
*B32B 15/04* (2006.01)
*C22C 38/50* (2006.01)
*C22C 21/04* (2006.01)
*C23C 28/02* (2006.01)
*B32B 15/18* (2006.01)
*C22C 38/28* (2006.01)
*C22C 38/44* (2006.01)
*C23C 30/00* (2006.01)
*C22C 38/26* (2006.01)

(52) U.S. Cl.
CPC .............. *C21D 6/005* (2013.01); *C21D 6/008* (2013.01); *C21D 9/46* (2013.01); *C22C 21/00* (2013.01); *C22C 21/02* (2013.01); *C22C 21/04* (2013.01); *C22C 21/06* (2013.01); *C22C 38/008* (2013.01); *C22C 38/02* (2013.01); *C22C 38/04* (2013.01); *C22C 38/06* (2013.01); *C22C 38/10* (2013.01); *C22C 38/12* (2013.01); *C22C 38/14* (2013.01); *C22C 38/18* (2013.01); *C22C 38/22* (2013.01); *C22C 38/24* (2013.01); *C22C 38/26* (2013.01); *C22C 38/28* (2013.01); *C22C 38/44* (2013.01); *C22C 38/46* (2013.01); *C22C 38/48* (2013.01); *C22C 38/50* (2013.01); *C22C 38/60* (2013.01); *C23C 2/02* (2013.01); *C23C 2/12* (2013.01); *C23C 2/28* (2013.01); *C23C 2/40* (2013.01); *C23C 28/021* (2013.01); *C23C 28/022* (2013.01); *C23C 28/023* (2013.01); *C23C 30/00* (2013.01); *C23C 30/005* (2013.01); *C21D 2211/001* (2013.01); *C21D 2211/004* (2013.01); *Y10T 428/12757* (2015.01); *Y10T 428/12951* (2015.01); *Y10T 428/12958* (2015.01); *Y10T 428/12972* (2015.01); *Y10T 428/2495* (2015.01); *Y10T 428/24959* (2015.01); *Y10T 428/24967* (2015.01); *Y10T 428/26* (2015.01); *Y10T 428/263* (2015.01); *Y10T 428/264* (2015.01); *Y10T 428/265* (2015.01)

(58) Field of Classification Search
CPC ....... C22C 38/008; C22C 38/02; C22C 38/04; C22C 38/06; C22C 38/10; C22C 38/12; C22C 38/14; C22C 38/22; C22C 38/24; C22C 38/26; C22C 38/28; C22C 38/44; C22C 38/46; C22C 38/48; C22C 38/50; C22C 21/02; C22C 21/00; C22C 21/04; C22C 21/06; C21D 2211/001; C21D 2211/004; C21D 6/008; C21D 6/005; C21D 9/46; C23C 28/023; C23C 28/021; C23C 28/022; C23C 2/02; C23C 2/12; C23C 2/28; C23C 2/40; C23C 30/00; C23C 30/005; Y10T 428/12757; Y10T 428/12951; Y10T 428/12972; Y10T 428/12958; Y10T 428/2495; Y10T 428/24959; Y10T 428/24967; Y10T 428/263; Y10T 428/264; Y10T 428/265; Y10T 428/26

See application file for complete search history.

(56) References Cited

U.S. PATENT DOCUMENTS

| | | | |
|---|---|---|---|
| 2009/0053556 | A1* | 2/2009 | Sohn .................. C22C 18/00 428/659 |
| 2011/0017361 | A1 | 1/2011 | Meurer et al. |
| 2011/0300407 | A1 | 12/2011 | Cho et al. |

FOREIGN PATENT DOCUMENTS

| | | |
|---|---|---|
| CN | 103261466 | 8/2013 |
| CN | 103370434 | 10/2013 |
| CN | 103917681 | 7/2014 |
| EP | 2554699 | 2/2013 |
| EP | 2653581 | 10/2013 |
| EP | 2778247 | 9/2014 |
| JP | 11279734 | 10/1999 |
| JP | 2008519160 | 6/2008 |
| JP | 2011514436 | 5/2011 |
| JP | 2011246744 | 12/2011 |
| KR | 100742833 | 7/2007 |
| KR | 1020090072118 | 7/2009 |
| KR | 1020100113134 | 10/2010 |
| KR | 1020110050191 | 5/2011 |
| KR | 1020120134709 | 12/2012 |
| KR | 1020140025324 | 3/2014 |
| KR | 1020140129529 | 11/2014 |
| WO | 02101109 | 12/2002 |
| WO | 2009084792 | 7/2009 |
| WO | 2011122237 | 10/2011 |
| WO | 2012077150 | 6/2012 |
| WO | 2012091319 | 7/2012 |
| WO | 2012115291 | 8/2012 |

OTHER PUBLICATIONS

Chinese Office Action—Chinese Application No. 201680076174.3 dated Jul. 23, 2019, citing WO2009/084792, CN102348824, CN101346489, KR10-2011-0050191, KR101284420, CN103261466, CN103370434 and CN103917681.
Japanese Office Action—Japanese Application No. 2018-532609 dated Jul. 9, 2019, citing JP 2008-519160, WO 2012/115291, JP 2011-514436 and JP 11-279734.
International Search Report—PCT/KR2016/015089 dated Mar. 27, 2017.
European Search Report—European Application No. 16879358.6, dated Aug. 28, 2018, citing EP 2 778 247, EP 2 653 581, and WO 2012/091319.

* cited by examiner

AUSTENITE-BASED MOLTEN ALUMINUM-PLATED STEEL SHEET HAVING EXCELLENT PROPERTIES OF PLATING AND WELDABILITY

TECHNICAL FIELD

The present disclosure relates to an austenite-based molten aluminum-plated steel plate with excellent plating properties and weldability and a method of manufacturing the same.

BACKGROUND ART

Recently, there has been strong demand for lightweight vehicles along with control of carbon dioxide emissions for lowering global warming and, simultaneously, steel plates for vehicle have continuously grown extra strong to enhance vehicle crash stability.

In general, a low-temperature transformed structure is mostly used to produce such a cold rolled steel plate with extra high strength. However, when the low-temperature transformed structure is used to achieve extra high strength, it is difficult to ensure elongation equal to or greater than 20% in the case of tensile strength of 1000-MPa class or more and, thus, there is a limit in freely designing components in accordance with desired use.

As a representative example of various attempts for providing steel with excellent formability and mechanical property, International Publication No. 2011-122237 discloses a steel plate including 0.5 to 1.5 wt % of C, 0.01 to 0.1 wt % of Si, 10 to 25 wt % of Mn, 0.1 wt % or less of P, 0.05 wt % or less of S, 0.01 to 0.1 wt % of Al, 3.0 to 8.0 wt % of Ni, 0.01 to 0.1 wt % of Mo, 0.01 wt % or less of N, the remaining component of Fe, and inevitable impurities, the steel plate is a high-tension steel plate having a high level of ductility and tensile strength of 700 to 900 MPa, and International Publication No. 2002-101109 discloses a steel plate including 1.00 wt % or less of C, 7.00 to 30.00 wt % of Mn, 1.00 to 10.00 wt % of Al, 2.50 to 8.00 wt % of Si, 3.50 to 12.00 wt % of Al+Si, 0.00 to 0.01 wt % of B, Fe, and inevitable impurities.

However, these steel plates have degraded crash properties due to low yield strength and non-plated steel plates are also difficult to withstand a corrosive environment for a long time and, thus, the steel plates disadvantageously have a limit in being applied to steel for a vehicle.

When a molten zinc plated steel plate of high manganese steel is used as a steel plate for a vehicle, components are processed via pressure working and, then, are welded to be assembled via spot welding, arc welding, or the like and, in this case, when the molten zinc plated steel plate of high manganese steel is spot-welded, a welding heat affected zone (HAZ) is dissolved via welding heat (input) and remains as molten zinc in a liquid state, and a base structure increases to a high temperature compared with other steel types due to a high resistance value of high manganese steel and extends in a grain boundary due to a high thermal expansion coefficient. In this state, when tensile force is applied to the HAZ, molten zinc in a liquid phase penetrates into a grain boundary of a base surface in a welding HAZ structure to cause a crack and welding liquid metal embrittlement (LME) that is brittle fracture is caused.

As a method of preventing welding LME of galvanized steel iron with extra high strength, methods of refining a grain boundary of abase steel plate or removing a strength difference between an intra grain and a grain boundary have been well known, but since high manganese steel has an austenite structure even at room temperature, high manganese steel has high weld heat input and thermal expansion coefficient and, thus, these methods are not effective in galvanized steel iron using high manganese steel using a plating material. That is, this is because, during spot welding, temperature of a welding shoulder portion rapidly increases up to 800° C., whereas a zinc plated layer begins to be melted at about 420° C. and becomes in a liquid phase and, as temperature of the welding shoulder portion is further increased, as fluidity of the liquid-phase material formed by melting the zinc plated layer is suddenly increased and the liquid-phase material penetrates into a grain boundary of the base steel plate, welding LME crack occurs.

Accordingly, research has been conducted into enhance weldability using aluminum (Al) as a material for formation of a plated layer. However, in the case of a molten aluminum plated steel plate using high-strength steel as a base, a large amount of Si, Mn, and Al, included in the steel, forms a single or complex oxide during an annealing process and, thus, it is difficult to ensure plating property of the molten aluminum.

DISCLOSURE

Technical Problem

An aspect of the present disclosure is to provide an austenite-based molten aluminum-plated steel plate with excellent plating properties and weldability and a method of manufacturing the same.

Technical Solution

According to an aspect of the present disclosure, an austenite-based molten aluminum-plated steel plate includes a base steel plate including 0.3 to 0.9% of carbon (C), 12 to 25% of manganese (Mn), 0.5 to 2.5% of silicon (Si), 0.3 to 3.0% of aluminum (Al), 0.01 to 0.5% of titanium (Ti), 0.05 to 0.5% of vanadium (V), 0.01 to 0.5% of molybdenum (Mo), 0.01 to 0.2% of tin (Sn), 0.001 to 0.1% of cobalt (Co), 0.001 to 0.1% of tungsten (W), the remaining of iron (Fe), and other inevitable impurities, on a wt % basis, and a molten aluminum-based plated layer formed on a surface of the base steel plate.

According to an aspect of the present disclosure, a method of manufacturing an austenite-based molten aluminum-plated steel plate includes preparing a base steel plate including 0.3 to 0.9% of carbon (C), 12 to 25% of manganese (Mn), 0.5 to 2.5% of silicon (Si), 0.3 to 3.0% of aluminum (Al), 0.01 to 0.5% of titanium (Ti), 0.05 to 0.5% of vanadium (V), 0.01 to 0.5% of molybdenum (Mo), 0.01 to 0.2% of tin (Sn), 0.001 to 0.1% of cobalt (Co), 0.001 to 0.1% of tungsten (W), the remaining of iron (Fe), and other inevitable impurities, on a wt % basis, heating the base steel plate to 700 to 850° C. under a reduction condition at dew point temperature or −30° C. or less and, then, maintaining the base steel plate, cooling the heated and maintained base steel plate, and immersing and plating the cooled base steel plate in an aluminum-based plating bath

Advantageous Effects

As set forth above, according to an exemplary embodiment in the present disclosure, an austenite-based molten aluminum-plated steel plate may advantageously have excellent plating properties and weldability.

It will be appreciated by persons skilled in the art that the effects that could be achieved with the present disclosure are not limited to what has been particularly described hereinabove and other advantages of the present disclosure will be more clearly understood from the following detailed description.

BEST MODE FOR INVENTION

The inventors of the present disclosure recognize that it is possible to ensure austenite in a refined structure of steel at room temperature by adding lots amounts of manganese and carbon in conventional high manganese steel but there is a problem in that crash performance is degraded due to low yield strength and have conducted research to resolve the problem. As a result, they recognize that a steel material with excellent formability and yield strength is ensured by appropriately controlling contents of carbon, manganese, and aluminum, which stabilize an austenite structure of a component system of steel, and, simultaneously, complexly adding elements for forming refined precipitates. In addition, they verify that plating property and weldability of an austenite-based high manganese molten aluminum plated steel plate by complexly adding a small amount of tungsten (W) and cobalt (Co) which are well known as a crystal stressing element of steel to prevent manganese (Mn) from being surface-diffused during annealing heat treatment and to prevent molten metal from penetrating into a parent material during spot welding and complete embodiments of the present disclosure.

Figure 1:
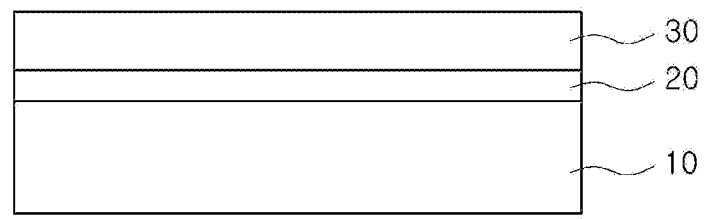
FIG. 1 is a schematic diagram of an austenite-based molten aluminum-plated steel plate according to the present disclosure.
Figure 2:
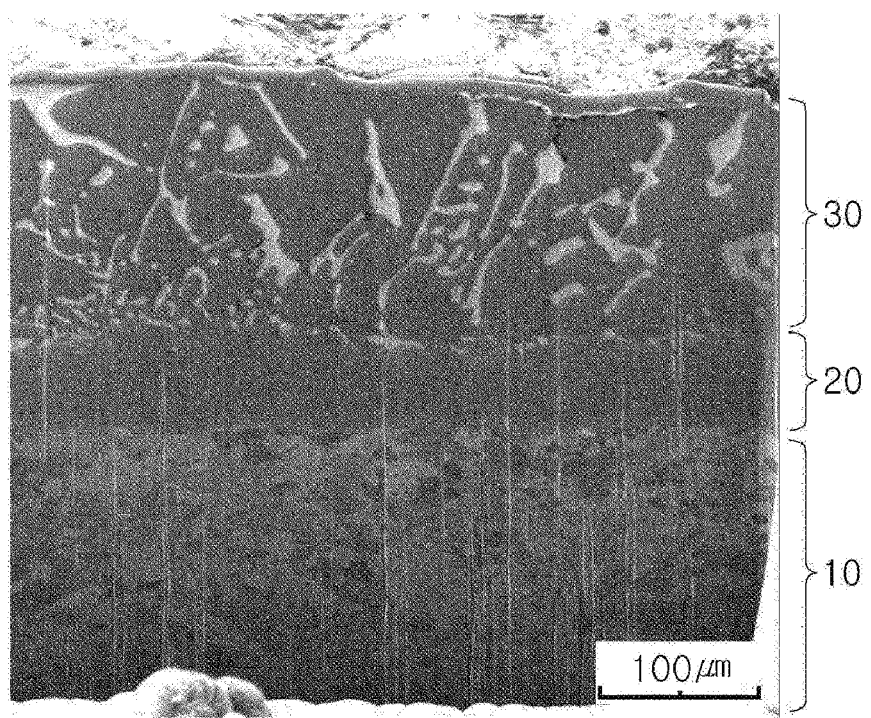
FIG. 2 is a field emission scanning electron microscope (FE-SEM) image of a cross section of an austenite-based molten aluminum-plated steel plate according to an embodiment of the present disclosure.

FIG. 1 is a schematic diagram of an austenite-based molten aluminum-plated steel plate according to the present disclosure. FIG. 2 is a field emission scanning electron microscope (FE-SEM) image of a cross section of an austenite-based molten aluminum-plated steel plate according to an embodiment of the present disclosure. Hereinafter, an austenite-based molten aluminum-plated steel plate according to an aspect of the present disclosure is described in detail with reference to FIGS. 1 and 2.

Referring to FIGS. 1 and 2, the austenite-based molten aluminum-plated steel plate according to an aspect of the present disclosure may include a base steel plate 10 and a molten aluminum-based plated layer 30 formed on a surface of the base steel plate and, as necessary, may further include an Al—Fe—Si—Mn-based alloy layer 20 formed on a boundary surface between the base steel plate 10 and a molten aluminum-based plate layer 30.

First, alloy components and an appropriate content range of the base steel plate 10 are described below in detail. It is noted that the following contents of each component are based on weight unless the context clearly indicates otherwise.

Carbon (C): 0.3 to 0.90

Carbon is an element for stabilization of an austenite structure and, as content thereof is increased, the austenite structure is more advantageously ensured. Carbon increases stacking fault energy of steel and increases both tensile strength and elongation. When carbon content is less than 0.3%, an α' (alpha')-martensite structure may be formed to be vulnerable with respect to delayed fracture via decarbonization during high-temperature processing of the steel plate and it may be difficult to ensure target tensile strength and elongation. On the other hand, when the carbon content is greater than 0.90, resistivity may be increased to degrade weldability. Accordingly, according to the present disclosure, the carbon content may be limited to 0.3 to 0.9%.

Manganese (Mn): 12 to 25%

Manganese is an element for stabilization of an austenite structure along with carbon. When manganese content is less than 12%, an α' (alpha')-martensite structure may be formed while being deformed and, it may be difficult to ensure a stable austenite structure and, on the other hand, when the manganese content is greater than 25%, it may be disadvantageous to saturate an effect of enhancing strength and to increase manufacturing costs. Accordingly, according to the present disclosure, the manganese content may be limited to 12 to 25%.

Silicon (Si): 0.5 to 2.5%

Silicon is an element that is generally used as a deoxidizer of steel but, according to the present disclosure, may enhance yield strength and tensile strength of steel via solid-solution strengthening. In particular, according to the present disclosure, when appropriate content of silicon is complexly added to titanium (Ti) and vanadium (V) as a carbonitride forming element, it is seen that carbonitride is refined to obtain a more refined crystal grain than in the case in which only a carbonitride forming element is added. According to the present disclosure, the silicon content may be equal to or greater than 0.5% to obtain such an effect. However, the silicon content is greater than 2.5%, a high amount of silicon oxide may be formed on a surface thereof during hot rolling to degrade acid pickling property and to increase resistivity, thereby degrading weldability. Accordingly, according to the present disclosure, the silicon content may be limited to 0.5 to 2.5%.

Aluminum (Al): 0.3 to 3.0%

Aluminum is an element that is usually added for deoxidization of steel but, according to the present disclosure, may enhance stacking fault energy to prevent ε (epsilon)-martensite from being generated to enhance flexibility and delayed fracture resistance properties of steel. When aluminum content is less than 0.3%, there may be a problem in that the flexibility of steel is degraded according to a drastic work hardening phenomenon and delayed fracture resistance property is degraded and, on the other hand, when the aluminum content is greater than 3.0%, there may be a problem in that the tensile strength of steel is degraded, castability is degraded, and a steel surface is seriously oxidized during hot rolling to degrade surface quality. Accordingly, according to the present disclosure, the aluminum content may be limited to 0.3 to 3.0%.

Titanium (Ti): 0.01 to 0.5%

Titanium reacts with nitrogen of steel to form a nitride and to enhance the formability of steel and reacts with carbon of steel to form carbide and to enhance strength of steel. According to the present disclosure, to obtain such an effect, titanium content may be equal to or greater than 0.01%. However, when the titanium content is greater than 0.5%, there is a problem in that an excessive amount of a precipitate is formed to degrade the fatigue property of steel. Accordingly, according to the present disclosure, the titanium content may be limited to 0.01 to 0.5%.

Vanadium (V): 0.05 to 0.5%

Vanadium is an element that reacts with carbon and/or nitrogen to form a precipitate and, in particular, according to the present disclosure, may be an important element that forms a minute precipitate at low temperature to increase yield strength of steel. According to the present disclosure, to obtain such an effect, vanadium content may be equal to or greater than 0.05%. However, when vanadium content is greater than 0.5%, there may be a problem in that coarsened carbonitride is formed at high temperature, hot processability is degraded, and yield strength of steel is degraded. Accordingly, according to the present disclosure, the vanadium content may be limited to 0.05 to 0.5%.

Molybdenum (Mo): 0.01 to 0.5%

Molybdenum is an element for enhancing high-temperature strength and, in particular, according to the present disclosure, molybdenum may enhance yield strength of steel and may have content of 0.01% or more of steel to achieve such an effect. However, when molybdenum content is greater than 0.5%, there may be a problem in that hot processability is degraded and competitiveness is disadvantageously low in terms of product prices. Accordingly, according to the present disclosure, the molybdenum content may be limited to 0.01 to 0.5%.

Tin (Sn): 0.01 to 0.2%

In general, like in the present disclosure, when a high amount of silicon and manganese are included in steel, silicon and manganese with high oxygen affinity form a single or complex oxide on a surface layer of a steel plate during annealing, thereby degrading plating property. Tin is important to effectively suppress surface concentration of manganese of steel to prevent a manganese-based oxide from being formed, thereby enhancing plating property. According to the present disclosure, to obtain such an effect, tin content may be equal to or greater than 0.01%. However, when tin content is greater than 0.2%, the effect may be saturated and it is difficult to ensure economization of competitiveness in terms of prices. Accordingly, according to the present disclosure, the tin content may be limited to 0.01 to 0.2%.

Tungsten (W): 0.001 to 0.1%

Tungsten is a crystal stressing element and a small amount of tungsten is added to enhance strength of steel. In addition, tungsten forms grain carbide to suppress surface diffusion of manganese to enhance plating property via a grain boundary during annealing heat treatment and suppresses grain diffusion to prevent LME crack from occurring when a parent material penetrates into molten metal during spot welding. According to the present disclosure, to obtain such an effect, tungsten content may be equal to or greater than 0.001%. However, when tungsten content is greater than 0.1%, the effect is saturated and it is difficult to ensure economization of competitiveness in terms of prices. Accordingly, according to the present disclosure, the tungsten content may be limited to 0.001 to 0.1%.

Cobalt (Co): 0.001 to 0.1%

When complexly added to tungsten, cobalt forms a compound to enhance high-temperature strength. Along with tungsten, cobalt suppresses surface diffusion of manganese via a grain boundary to enhance plating property during annealing heat treatment and suppresses grain diffusion to prevent LME crack from occurring when a parent material penetrates into molten metal during spot welding. According to the present disclosure, to obtain such an effect, cobalt content may be equal to or greater than 0.001%. However, when the cobalt content is greater than 0.1%, the effect is saturated and it is difficult to ensure economization of competitiveness in terms of prices. Accordingly, according to the present disclosure, the cobalt content may be limited to 0.001 to 0.1%.

Other than the above composition, the remaining element may be iron (Fe). However, unintended impurities from a material or a surrounding environment are inevitably introduced and, thus, the impurities are not capable of being disregarded. These impurities are known to one of ordinary skill in the art in a common manufacturing process and, thus, information on the impurities is not described throughout this specification.

Addition of effective elements other than the above composition may not be precluded and, for example, the base steel plate may further include one or more selected from the group consisting of 0.5% or less of Cr (excluding 0%), 0.05% or less of Nb (excluding 0%), and 0.1% or less of Sb (excluding 0%) on a wt % basis.

Chromium (Cr): 0.5% or Less (Excluding 0%)

Chromium forms a refined oxide film on a surface layer to prevent oxygen from being internally introduced and to prevent decarbonization and, thus, stabilizes an austenite structure. However, when 0.5% or more of chromium content is added, carbide is formed on a grain boundary to generate a crack core and, thus, there may be a problem in that delayed fracture resistance property is degraded and, accordingly, 0.5% or less of chromium may be added.

Niobium (Nb): 0.05% or Less (Excluding 0%)

When complexly added to vanadium, niobium forms carbonitride to refine a crystal grain and to enhance strength. However, 0.05% or more of niobium is added, high-temperature flexibility (hot ductility) may be reduced and slab quality may be degraded and, accordingly, 0.05% or less of niobium may be added.

Antimony (Sb): 0.1% or Less (Excluding 0%)

Antimony is an element concentrated directly below a surface layer of a steel plate during annealing heat treatment and prevents Si, Mn, and Al alloy elements from being diffused to a surface along a grain boundary to ensure molten aluminum plating property. However, a scale may remain on a surface layer during cold rolling acid pickling to degrade acid pickling property and, accordingly, 0.1% or less of antimony may be controlled.

When an alloy of a steel material including the above component range is designed, the sum of contents of W and Co may be 0.01% or more. When the sum of the contents of these elements is less than 0.01%, it may be difficult to sufficiently achieve crystal stressing using W and Co and to sufficiently prevent Si, Mn, and Al from being surface-concentrated and, accordingly, non-plate may occur or spot welding LME property may be degraded.

When an alloy of a steel material including the above component range is designed, the sum of contents of Mo and V may be 0.6% or more. When the sum of the contents of these elements is less than 0.6%, a refined carbonitride may not be smoothly formed during annealing heat treatment and, thus, crystal grain may not be sufficiently refined. Accordingly, a strength enhancement effect and an effect of improving spot welding LME property based on stress distribution may be insufficient.

According to an example, the base steel plate 10 may include carbonitride including Ti and/or V and an average equivalent circular diameter of the carbonitride may be 100 nm or less (excluding 0 nm). When the average equivalent circular diameter of the carbonitride is greater than 100 nm, crystal grain may not be effectively refined to degrade yield strength of steel.

According to an example, a yield ratio (yield strength/tensile strength) of the base steel plate 10 may be equal to or greater than 0.68. When the yield ratio is less than 0.68, crash energy absorption may not be sufficient in the case of crash of structural members.

The molten aluminum-based plated layer 30 may be formed on a surface of a base steel plate to enhance anti-corrosion of a steel plate. According to the present disclosure, composition of the molten aluminum-based plated layer 30 is not particularly limited and, thus, the molten aluminum-based plated layer 30 may be a pure aluminum plated layer or an aluminum-based alloy plated layer including Si, Mg, or the like. Hereinafter, types of elements included in the molten aluminum-based plated layer 30 and an exemplary content range of these are described in detail.

Si: 7 to 12%

When excellent processability or anti-oxidation is required, an appropriate amount of Si may be added. However, when an excessive amount of Si is added, temperature of a plating bath may be excessively increased and primary crystal of coarsened Si may be crystallized and, rather, there may be a worry about degraded anti-corrosion and processability. In consideration of this, Si content may be 7 to 12% and, more preferably, 8 to 10%.

Mg: 3 to 5%

When excellent anti-corrosion is required, an appropriate amount of Mg may be added. When Mg is added, hardness of a surface layer of a plated layer may be increased to lower a friction coefficient, thereby enhancing processability. However, when content of Mg is excessive, an Mg oxide is formed due to high oxygen affinity to generate plating bath dross. In consideration of this, the content of Mg may be 3 to 5%.

As necessary, the austenite-based molten aluminum-plated steel plate according to the present disclosure may further include the Al—Fe—Si—Mn-based alloy layer 20 formed on a boundary surface between the base steel plate 10 and the molten aluminum-based plated layer 30 and, in this case, the Al—Fe—Si—Mn-based alloy layer may include Fe and Mn, the sum of which is 23 wt % or more. Fe and Mn included in the alloy layer may be from plating bath components or may be diffused from the base steel plate during melting plating. When the sum of contents of Fe and Mn is less than 23 wt %, Fe and Mn of the base steel plate may be prevented from being diffused into the Al—Fe—Si—Mn-based alloy layer due to a Si, Mn, or Al oxide that is formed and concentrated in the form of a layer on a surface of the base steel plate during annealing heat treatment in a procedure in which the base steel plate is immersed and plated in the plating bath and, in this case, plating and adhesive properties may be degraded.

According to an example, when a thickness of the Al—Fe—Si—Mn-based alloy layer 20 is x and a thickness of the molten aluminum-based plated layer 30 is y, y/x may be equal to or greater than 1 or equal to or less than 6. When y/x is less than 1, wettability of molten aluminum may be degraded due to a Si, Mn, or Al oxide during a plating bath immersing procedure to reduce a thickness of a plated layer and, thus, the plated layer may be locally thinned at a portion in which an annealing oxide is present to cause defective plating of flow mark patterns due to a non-uniform thickness of the plated layer throughout a test piece. On the other hand, when y/x is greater than 6, Fe of the steel plate may not be smoothly diffused and, thus, an Al—Fe—Si—Mn-based alloy layer may be thinned and an anchoring effect based on weak alloying of a boundary surface of plating/base may be negligible, thereby degrading plating adhesive property.

According to an example, Al—Si—Mg alloy phase with a thickness of 1 μm or less (excluding 0 μm) may be intermittently formed on a boundary surface between the Al—Fe—Si—Mn-based alloy layer 20 and the molten aluminum-based plated layer 30 at an interval of 2 μm or less (excluding 0 μm) in a horizontal direction of the base steel plate. When the thickness of the Al—Si—Mg alloy phase is greater than 1 μm or the interval therebetween is greater than 2 μm, crack may occur in brittle Al—Si—Mg alloy phase or peel may be caused in the plated layer due to the alloy phase that are continuously formed in a horizontal direction.

As described above, the aforementioned austenite-based molten aluminum-plated steel plate according to the present disclosure may be manufacture in various methods and the manufacturing method is not particularly limited. However, the austenite-based molten aluminum-plated steel plate may be manufactured using the following method according to an embodiment.

First, a base steel plate that satisfies the aforementioned alloy composition is heated and, then, is maintained under a reduction condition.

In this case, dew point temperature may be controlled to −30° C. This is for preventing concentrating of Si, Mn, and Al oxides on a surface of a steel plate and, when dew point temperature is greater than −30° C., Mn of steel may react with oxygen to form Mn oxide in the form of a band on a surface layer of the steel plate, thereby degrading wettability of molten aluminum.

In this case, heating temperature may be 700 to 850° C. When the heating temperature is less than 700° C., the heating temperature may be lowered compared with Al transformation temperature (about 726° C.) and, thus, it may be difficult to ensure an austenite single-phase structure. On the other hand, when heating temperature is excessively high, tensile strength or elongation of steel may be degraded via secondary recrystallization and Si, Mn, and Al oxides may be formed to be thickened on a surface of a steel plate to cause non-plating and plating peel phenomenon. To prevent this, the heating temperature may be controlled to 850° C. and, more preferably, 820° C. or less.

According to an example, the reduction condition may be an atmosphere of 3 to 20 vol % of hydrogen ($H_2$) and the remaining nitrogen ($N_2$) gas. When hydrogen content is less than 3 vol %, an iron oxide film that is inevitably formed on a surface of a steel plate is not sufficiently reduced and, thus, there is a worry about peeling of a plated layer due to the remaining oxide layer. However, when hydrogen content is excessively high, costs may be increased along with increase in hydrogen content and danger of explosion may be increase and, thus, the hydrogen content may be limited to 20 vol % or less.

Then, the base steel plate that is heated and maintained under a reduction condition may be cooled.

According to an example, temperature of the cooled base steel plate, i.e., temperature of the base steel plate immediately before or after the base plate is immersed in an aluminum-based plating bath may be 560 to 660° C. When the temperature is less than 560° C., speed at which molten aluminum is solidified on a surface of a steel plate is sharply increased to reduce fluidity on the surface of the steel plate and, thus, there may be a worry in that a deviation of plating coating amounts for respective parts is accelerated to cause non-plating defects. On the other hand, when the temperature is greater than 660° C., dissolution of the steel plate may be facilitated to acceleratedly generate dross in the form of a Fe—Al compound and to cause non-plating.

Then, the cooled base steel plate may be immersed and plated in an aluminum-based plating bath. The aluminum-based plating bath may be a pure aluminum plating bath or an aluminum-based alloy plating bath including Si, Mg, or the like.

According to an example, when entering temperature of the base steel plate is Td(° C.) and temperature of the aluminum-based plating bath is Tp(° C.), Td may satisfy (Tp−80°) C. or more or (Tp−10°) C. or less. When Td is less than (Tp−80°) C., viscosity of the plating bath is excessively increased to lower mobility of a roll wound around the steel plate and, thus, there is a worry in that slip between the steel plate and the roll to cause defects of the surface of the steel plate. On the other hand, when Td is greater than (Tp−10°) C., dissolution of the steel plate may be facilitated to acceleratedly generate dross in the form of a Fe—Al compound and to cause non-plating.

Then, as necessary, the aluminum-based plated steel plate may be alloying-heat treated at temperature of 720 to 840° C. The temperature of alloying-heat treatment may be controlled to 720° C. or more to ensure sufficient content of Fe in the aluminum-based plated layer and the temperature of alloying-heat treatment may be controlled to 840° C. or less to prevent a powdering phenomenon whereby the plated layer is peeled during processing due to an excessive amount of Fe of the plated layer.

MODE FOR INVENTION

Hereinafter, the present disclosure will be described in detail by explaining exemplary embodiments. However, the features of the present disclosure will be more clearly understood and should not be limited by the exemplary embodiments of the present disclosure. The scope of the present disclosure should be determined by the appended claims and their equivalents coming within the meaning of the appended claims are intended to be embraced therein.

A steel ingot with alloy composition shown in Table 1 below was homogenization-treated for one hour in a heating furnace at 1180° C. and, then, was rolled at finish rolling temperature of 900° C. to manufacture a hot rolled steel plate. Then, the hot rolled steel plate was wound at winding temperature of 400° C., was acid pickled and, then, was cold-rolled at a cold reduction ratio of 55% to manufacture a cold rolling steel plate. Then, the cold rolling steel plate was heated at temperature shown in Table 2 below and cracking was performed under a nitrogen gas atmosphere including 5 vol % of hydrogen. Then, the steel plate was immersed in a plating bath for five seconds to manufacture a plated steel plate. In this case, Inventive Examples 1 to 5 used a plating bath including Si of 9 wt % and the remaining element of Al and Comparative Examples 1 to 5 used a plating bath including Al of 0.2 wt % and the remaining element of Zn. Then, a plating coating amount covered on a surface via air whipping was prepared to be maintained in a level of 70 g/m².

To evaluate the mechanical property of the steel plate on which the plating process is completed, the steel plate was cut in 40 mm×200 mm in a perpendicular direction to a rolling direction to manufacture a tensile test piece with side milling grinding and JIS No. 5 standard, and yield strength (YS) and tensile strength (TS) of the tensile test piece were measured by a tensile tester and were shown together in Table 2 below.

To evaluate the plating property of the steel plate on which the plating process is completed, a covering area ratio of an aluminum-based plated layer was measured with respect to an entire area of a plated surface and was also shown in Table 2. To observe a cross section of the test piece, the text piece was cut in 15 mm×15 mm, the cross section was grinded and, then, a plated layer was observed by a scanning electron microscope (SEM). To measure the plating adhesive property of the steel plate, the test piece with a size of 30 mm×80 mm was processed to be bent at 180° and, then, a bending test was performed. In a range in which a material is not torn depending on the material property of the steel plate, OT bending was performed. When a transparent vinyl tape is attached to and detached from a bending portion, the case in which a plated layer peels is represented by 'Peel' and the case in which the plated layer does not absolutely peel is represented by 'No peel' in Table 2 below.

To evaluate spot weldability, welding was performed at welding load of 2.6 kN in a condition of weld time of 16 cycles and holding time of 15 cycles while welding current flows using an Cu—Cr electrode with a fore-end diameter of 6 mm. When a steel plate thickness is t, welding current at a time point when a nugget diameter becomes smaller than 4 root t was determined as a lower limit, welding current at a time point when splash occurs was determined as an upper limit (expulsion current), and a difference value to current in which LME crack does not occur from the lower limit was referred to as no LME crack current range and was shown in Table 2 below.

Figure 3:
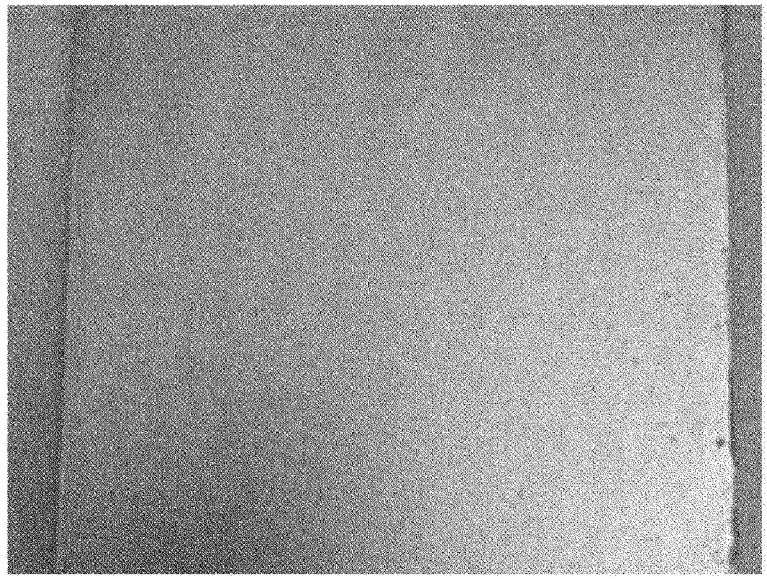
FIG. 3 is an image of an outer appearance of a test piece of a plated steel plate according to Inventive Example 1.
Figure 4:
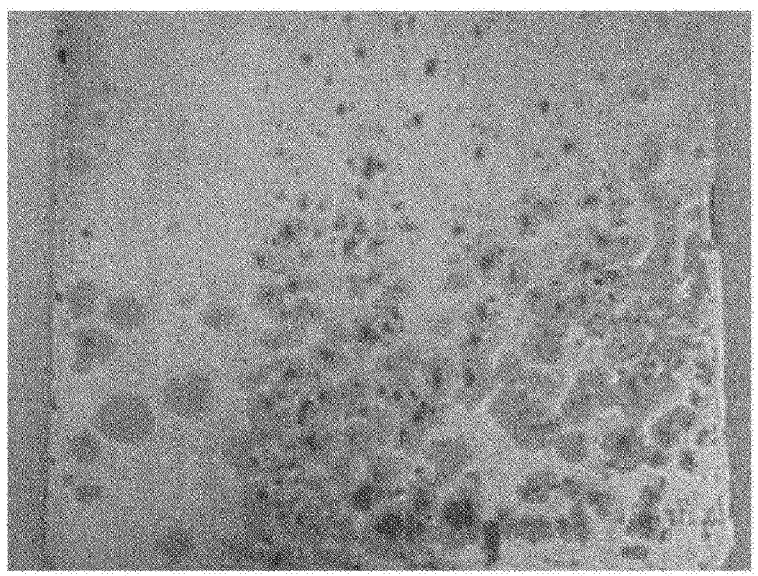
FIG. 4 is an image of an outer appearance of a test piece of a plated steel plate according to Comparative Example 1.

FIG. 3 is an image of an outer appearance of a test piece of a plated steel plate according to Inventive Example 1 and FIG. 4 is an image of an outer appearance of a test piece of a plated steel plate according to Comparative Example 1.

TABLE 1

| Division | Base Steel plate Composition (wt %) | | | | | | | | | | W + Co content (wt %) | V + Mo content (wt %) |
| --- | --- | --- | --- | --- | --- | --- | --- | --- | --- | --- | --- | --- |
| | C | Si | Mn | Al | Mo | Ti | V | Sn | W | Co | | |
| Invention Example1 | 0.67 | 0.75 | 16.1 | 1.25 | 0.32 | 0.06 | 0.29 | 0.026 | 0.02 | 0.03 | 0.05 | 0.61 |
| Invention Example2 | 0.69 | 0.61 | 16.6 | 1.43 | 0.29 | 0.07 | 0.33 | 0.028 | 0.02 | 0.02 | 0.04 | 0.62 |
| Invention Example3 | 0.7 | 0.62 | 17.0 | 1.33 | 0.34 | 0.06 | 0.27 | 0.022 | 0.05 | 0.05 | 0.1 | 0.61 |
| Invention Example4 | 0.67 | 0.77 | 16.8 | 1.35 | 0.31 | 0.08 | 0.32 | 0.029 | 0.01 | 0.02 | 0.03 | 0.63 |

TABLE 1-continued

| | Base Steel plate Composition (wt %) | | | | | | | | | | W + Co content (wt %) | V + Mo content (wt %) |
|---|---|---|---|---|---|---|---|---|---|---|---|---|
| Division | C | Si | Mn | Al | Mo | Ti | V | Sn | W | Co | | |
| Invention Example 5 | 0.71 | 0.65 | 16.9 | 1.19 | 0.26 | 0.08 | 0.34 | 0.023 | 0.04 | 0.03 | 0.07 | 0.6 |
| Comparative Example 1 | 0.69 | 0.2 | 17.0 | 1.11 | 0.15 | 0.07 | 0.22 | 0.030 | 0.0001 | 0.0002 | 0.0003 | 0.37 |
| Comparative Example 2 | 0.65 | 0.72 | 16.7 | 1.42 | 0.29 | 0.06 | 0.28 | 0.021 | 0.0003 | 0.0001 | 0.0004 | 0.57 |
| Comparative Example 3 | 0.59 | 0.43 | 16.2 | 1.31 | 0.27 | 0.06 | 0.28 | 0.029 | 0.0001 | 0.0002 | 0.0003 | 0.55 |
| Comparative Example 4 | 0.67 | 0.64 | 16.9 | 1.22 | 0.34 | 0.08 | 0.3 | 0.007 | 0.0002 | 0.0003 | 0.0005 | 0.64 |
| Comparative Example 5 | 0.71 | 0.75 | 16.6 | 1.35 | 0.35 | 0.07 | 0.27 | 0.035 | 0.0002 | 0.0003 | 0.0005 | 0.62 |

TABLE 2

| Division | Average equivalent circular diameter of carbonitride (nm) | YS (MPa) | TS (MPa) | YS/TS | Explu-sion current (A) | No LME crack current range (kA) |
|---|---|---|---|---|---|---|
| Invention Example 1 | 20 | 808.6 | 1182.6 | 0.68 | 7.2 | 1.6 |
| Invention Example 2 | 10 | 829.2 | 1184.7 | 0.70 | 7.0 | 1.4 |
| Invention Example 3 | 50 | 800.8 | 1183.2 | 0.68 | 7.4 | 1.8 |
| Invention Example 4 | 6 | 837.5 | 1185.5 | 0.71 | 7.2 | 1.6 |
| Invention Example 5 | 3 | 822.8 | 1208.1 | 0.68 | 7.0 | 1.4 |
| Comparative Example 1 | 250 | 683.5 | 1149.2 | 0.59 | 6.4 | 0.2 |
| Comparative Example 2 | 50 | 805.1 | 1158.8 | 0.69 | 6.2 | 0 |
| Comparative Example 3 | 150 | 724.9 | 1129.4 | 0.64 | 6.4 | 0.2 |
| Comparative Example 4 | 4 | 814.6 | 1186.2 | 0.69 | 6.8 | 0.6 |
| Comparative Example 5 | 1200 | 812.2 | 1190.6 | 0.68 | 6.4 | 0.4 |

| | Process Condition | | | | | Plated layer | | |
|---|---|---|---|---|---|---|---|---|
| Division | Dew point temperature (° C.) | Crack temperature (° C.) | Entering temperature (° C.) | Plating bath temperature (° C.) | Covering area ratio (area %) | alloy layer thickness ratio (y/x) | Area of content of AG, Mn or Alloy later (%) | Plating adhesive property |
| Invention Example 1 | −44 | 760 | 659 | 660 | 95 | 3.5 | 23.8 | No peel |
| Invention Example 2 | −48 | 750 | 665 | 660 | 96 | 4.3 | 24.2 | No peel |
| Invention Example 3 | −46 | 770 | 650 | 660 | 99 | 2.8 | 23.3 | No peel |
| Invention Example 4 | −50 | 720 | 600 | 660 | 97 | 5.6 | 25.0 | No peel |
| Invention Example 5 | −45 | 700 | 662 | 660 | 96 | 3.7 | 24.5 | No peel |
| Comparative Example 1 | −52 | 745 | 662 | 660 | 95 | 2.5 | 23.9 | No peel |

-continued

| | Process Condition | | | | Plated layer | | | |
|---|---|---|---|---|---|---|---|---|
| Division | Dew point temperature (° C.) | Crack temperature (° C.) | Entering temperature (° C.) | Plating bath temperature (° C.) | Covering area ratio (area %) | alloy layer thickness ratio (y/x) | Area of content of AG, Mn or Alloy later (%) | Plating adhesive property |
| Comparative Example 2 | −23.5 | 780 | 630 | 660 | 68 | 0.1 | 16.5 | Peel |
| Comparative Example 3 | −43 | 730 | 668 | 660 | 94 | 2.1 | 23.4 | No peel |
| Comparative Example 4 | −44 | 700 | 680 | 660 | 73 | 0.4 | 18.2 | Peel |
| Comparative Example 5 | −43 | 850 | 500 | 660 | 78 | 0.5 | 18.5 | Peel |

As seen from Table 3 above, Inventive Examples 1 to 5 above satisfy the ranges proposed by the present disclosure in terms of all of composition, manufacturing conditions, y/x, and the sum of contents of Fe and Mn in an alloy layer of the base steel plate and have a covering area ratio of 95% or more of an aluminum-based plated layer and, thus, have excellent plating properties and excellent plating adhesive property without peeling parts.

However, Comparative Examples 1 and 3 do not satisfy the ranges proposed by the present disclosure in terms of content of Si of steel and, thus, a size of carbonitride is not capable of being effectively refined to form a relatively coarsened crystal grain and, accordingly, yield strength is not even close to 800 MPa.

Comparative Example 2 is outside the ranges proposed by the present disclosure in terms of dew point temperature in a crack region and, thus, Mn oxide is formed on a surface of a steel plate in the form of a thick band to degrade plating property and to cause a plating peel phenomenon in which a plated layer peels. In addition, even if plating is performed, a plated layer is thin due to the formed Mn oxide and, thus, a thickness ratio between the plated layer and the alloy layer is reduced and Fe and Mn of a base steel plate are prevented from being diffused into the alloy layer during plating and immersing in a plating bath, thereby reducing the sum of contents of Fe and Mn in the alloy layer.

Comparative Example 4 does not satisfy the ranges proposed by the present disclosure in terms of contents of W and Co of steel, does not effectively prevent surface concentration of Mn of steel to form Mn-based oxide on a surface of a steel plate, has higher entering temperature of the steel plate than plating bath temperature by about 20° C., and has an insufficient confining effect due to thermal shock and, accordingly, a covering area ratio of an aluminum plated layer is just 73% to degrade plating property, thereby causing the plated layer to peel on a boundary surface between the plated layer and the base steel plate. Even if plating is performed, the plated layer is thin due to Mn oxide formed in the form of a layer on a surface of the steel plate and, thus, a thickness ratio between the plated layer and the alloy layer is reduced and Fe and Mn of the base steel plate are prevented from being diffused into the alloy layer during plating and immersing in a plating bath, thereby reducing the sum of contents of Fe and Mn in the alloy layer.

Comparative Example 5 exceeds the ranges proposed by the present disclosure in terms of annealing temperature in a crack region and does not reach a desired level of a steel material, i.e., tensile strength via secondary re-crystallization and, in this regard, as a relatively long time is taken to reach annealing temperature and annealing temperature is increased, a high amount of Si, Mn, or Al of steel is diffused into a surface of the steel plate to form Si, Mn, or Al oxide in the form of a band on a boundary surface between the plated layer and the base steel plate and entering temperature of the steel plate is higher than plating bath temperature by about 160° C. to achieve an oxide confining effect from thermal shock, but speed at which molten aluminum is solidified on a surface of the steel plate is rapidly increased due to low entering temperature of the steel plate to reduce fluidity on the surface of the steel plate and, accordingly, a deviation of plating coating amounts for respective parts is accelerated to cause non-plating defects and a covering area ratio of the aluminum plated layer is just 78% and, even if heat treatment is performed under a reduction condition, the plated layer peels due to Si, Mn, or Al oxide accumulating on a boundary surface between the plated layer and the steel plate after aluminum plating. In addition, during annealing heat treatment, even if plating is performed, the plated layer is thin due to Si, Mn, or Al oxide that is concentrated and formed in the form of a layer on the surface of the steel plate and, thus, a thickness ratio between the plated layer and the alloy layer is reduced and Fe and Mn of a base steel plate are prevented from being diffused into the alloy layer during plating and immersing in a plating bath, thereby reducing the sum of contents of Fe and Mn in the alloy layer.

In Inventive Examples 1 to 5, a plated layer includes aluminum as a main element to increase LME crack resistance and, thus, it may be seen that a current range in which LME crack does not occur is greater than 1.0 kA due to high crack resistance to have excellent weldability.

However, in Comparative Examples 1 to 5, a plated layer includes zinc as a main element and, thus, as zinc with a low melting point is not prevented from penetrating into a parent material during spot welding, LME crack occurs from a relatively low welding current value and, thus, a current range in which LME does not occur does not reach 1.0 kA.

The invention claimed is:

1. An austenite-based steel plate having an aluminum-based plated layer, the austenite-based steel plate comprising:
   a base steel plate including 0.3 to 0.9% of carbon (C), 12 to 25% of manganese (Mn), 0.5 to 2.5% of silicon (Si), 0.3 to 3.0% of aluminum (Al), 0.01 to 0.5% of titanium (Ti), 0.05 to 0.5% of vanadium (V), 0.01 to 0.5% of molybdenum (Mo), 0.01 to 0.2% of tin (Sn), 0.001 to 0.1% of cobalt (Co), 0.001 to 0.1% of tungsten (W), and a balance of iron (Fe) and inevitable impurities, on a wt % basis; and an aluminum-based plated layer formed on a surface of the base steel plate, wherein the base steel plate includes carbonitride having an average equivalent circular diameter of 100 nm or less.

2. The austenite-based steel plate of claim 1, wherein the base steel plate further includes one or more selected from the group consisting of 0.5% or less of chromium (Cr) (excluding 0%), 0.05% or less of niobium (Nb) (excluding 0%), and 0.1% or less of antimony (Sb) (excluding 0%), on a wt % basis.

3. The austenite-based steel plate of claim 1, wherein a sum of the W and the Co is 0.01% or more.

4. The austenite-based steel plate of claim 1, wherein a sum of the Mo and the V is 0.6% or more.

5. The austenite-based steel plate of claim 1, wherein the base steel plate has a yield ratio (yield strength/tensile strength) of 0.68 or more.

6. The austenite-based steel plate of claim 1, wherein the aluminum-based plated layer includes Si of 7 to 12 wt %.

7. The austenite-based steel plate of claim 6, wherein the aluminum-based plated layer further includes Mg of 3 to 5 wt %.

8. The austenite-based steel plate of claim 1, further comprising:
an Al-Fe-Si-Mn-based alloy layer formed on a boundary surface between the base steel plate and the aluminum-based plated layer,
wherein the Al-Fe-Si-Mn-based alloy layer includes Fe and Mn, a sum of which is 23 wt % or more.

9. The austenite-based steel plate of claim 8, wherein, when a thickness of the Al-Fe-Si-Mn-based alloy layer is x and a thickness of the aluminum-based plated layer is y, y/x is 1 or more or 6 or less.

10. The austenite-based steel plate of claim 8, wherein an Al-Si-Mg alloy phase with a thickness of 1μm or less (excluding 0μm) are intermittently formed on a boundary surface between the Al-Fe-Si-Mn-based alloy layer and the aluminum-based plated layer at an interval of 2μm or less (excluding 0μm) in a horizontal direction of the base steel plate.

11. An austenite-based steel plate having an aluminum-based plated layer, the austenite-based steel plate comprising:
a base steel plate including 0.3 to 0.9% of carbon (C), 12 to 25% of manganese (Mn), 0.5 to 2.5% of silicon (Si), 0.3 to 3.0% of aluminum (Al), 0.01 to 0.5% of titanium (Ti), 0.05 to 0.5% of vanadium (V), 0.01 to 0.5% of molybdenum (Mo), 0.01 to 0.2% of tin (Sn), 0.001 to 0.1% of cobalt (Co), 0.001 to 0.1% of tungsten (W), and a balance of iron (Fe) and inevitable impurities, on a wt % basis; and
an aluminum-based plated layer formed on a surface of the base steel plate,
wherein the base steel plate has a yield ratio (yield strength/tensile strength) of 0.68 or more.

12. The austenite-based steel plate of claim 11, wherein the base steel plate further includes one or more selected from the group consisting of 0.5% or less of chromium (Cr) (excluding 0%), 0.05% or less of niobium (Nb) (excluding 0%), and 0.1% or less of antimony (Sb) (excluding 0%), on a wt % basis.

13. The austenite-based steel plate of claim 11, wherein a sum of the W and the Co is 0.01% or more.

14. The austenite-based steel plate of claim 11, wherein a sum of the Mo and the V is 0.6% or more.

15. The austenite-based steel plate of claim 11, wherein the aluminum-based plated layer includes Si of 7 to 12 wt %.

16. The austenite-based steel plate of claim 15, wherein the aluminum-based plated layer further includes Mg of 3 to 5 wt %.

17. An austenite-based steel plate having an aluminum-based plated layer, the austenite-based steel plate comprising:
a base steel plate including 0.3 to 0.9% of carbon (C), 12 to 25% of manganese (Mn), 0.5 to 2.5% of silicon (Si), 0.3 to 3.0% of aluminum (Al), 0.01 to 0.5% of titanium (Ti), 0.05 to 0.5% of vanadium (V), 0.01 to 0.5% of molybdenum (Mo), 0.01 to 0.2% of tin (Sn), 0.001 to 0.1% of cobalt (Co), 0.001 to 0.1% of tungsten (W), and a balance of iron (Fe) and inevitable impurities, on a wt % basis;
an aluminum-based plated layer formed on a surface of the base steel plate; and
an Al-Fe-Si-Mn-based alloy layer formed on a boundary surface between the base steel plate and the aluminum-based plated layer,
wherein the Al-Fe-Si-Mn-based alloy layer includes Fe and Mn, a sum of which is 23 wt % or more.

18. The austenite-based steel plate of claim 17, wherein, when a thickness of the Al-Fe-Si-Mn-based alloy layer is x and a thickness of the aluminum-based plated layer is y, y/x is 1 or more or 6 or less.

19. The austenite-based steel plate of claim 17, wherein an Al-Si-Mg alloy phase with a thickness of 1μm or less (excluding 0μm) are intermittently formed on a boundary surface between the Al-Fe-Si-Mn-based alloy layer and the aluminum-based plated layer at an interval of 2μm or less (excluding 0μm) in a horizontal direction of the base steel plate.

* * * * *